United States Patent
Hartley et al.

(10) Patent No.: US 9,534,364 B2
(45) Date of Patent: Jan. 3, 2017

(54) DEVELOPMENTS RELATING TO WASHING/DRYING STATIONS IN WASHROOMS

(71) Applicant: Dyson Technology Limited, Wiltshire (GB)

(72) Inventors: Marcus Lee Hartley, Reading (GB); Thomas Andrew Weston, Shropshire (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 88 days.

(21) Appl. No.: 14/095,327

(22) Filed: Dec. 3, 2013

(65) Prior Publication Data
US 2014/0150177 A1 Jun. 5, 2014

(30) Foreign Application Priority Data
Dec. 3, 2012 (GB) .................................. 1221731.1

(51) Int. Cl.
*E03C 1/04* (2006.01)
*H01R 43/16* (2006.01)
(Continued)

(52) U.S. Cl.
CPC ................. *E03C 1/22* (2013.01); *A47K 10/48* (2013.01); *B23P 19/04* (2013.01); *E03C 1/04* (2013.01);
(Continued)

(58) Field of Classification Search
CPC .................................. E03C 1/04; A47K 10/48
(Continued)

(56) References Cited

U.S. PATENT DOCUMENTS 4,295,233 A * 10/1981 Hinkel et al. ...................... 4/619
9,194,110 B2 * 11/2015 Frick .......................... E03C 1/04
(Continued)

FOREIGN PATENT DOCUMENTS

DE 10 2004 005 161 8/2005
DE 20 2007 014 808 4/2009
(Continued)

OTHER PUBLICATIONS

Search Report dated Mar. 25, 2013, directed to GB Application No. 1221731.1; 1 page.
(Continued)

*Primary Examiner* — Christine Skubinna
(74) *Attorney, Agent, or Firm* — Morrison & Foerster LLP

(57) ABSTRACT

A combined washing/drying station for a washroom comprising a water outlet for discharging water to wash a user's hands connected to a mains water supply and an air outlet for discharging airflow to dry a user's hands. The airflow is generated by a blower module connected to a mains electricity supply via a connector unit hard-wired to the electrical mains. The blower module comprises an electrical connector which connects to an electrical connector on the connector unit to allow modular replacement of the blower module. Connection to the mains water supply is via the same or an additional connector unit plumbed into the water mains. A flow-control valve is provided on the respective connector unit for isolating the water mains at the connector unit. An inlet port of the valve is connected to the water mains and an outlet port of the valve is connected to the water outlet.

9 Claims, 16 Drawing Sheets

(51) Int. Cl.
*E03C 1/22* (2006.01)
*A47K 10/48* (2006.01)
*B23P 19/04* (2006.01)

(52) U.S. Cl.
CPC ...... *A47K 2210/00* (2013.01); *Y10T 29/49204* (2015.01)

(58) Field of Classification Search
USPC .......................... 4/678, 619; 34/202; 29/874
See application file for complete search history.

(56) References Cited

U.S. PATENT DOCUMENTS

| | | | |
|---|---|---|---|
| 2009/0272445 | A1 | 11/2009 | Shimizu et al. |
| 2012/0260418 | A1* | 10/2012 | Rundberg ............... E03C 1/057 4/623 |
| 2014/0027544 | A1* | 1/2014 | Hague et al. ................. 239/562 |

FOREIGN PATENT DOCUMENTS

| | | |
|---|---|---|
| JP | 2000-5416 | 1/2000 |
| JP | 2000-18646 | 1/2000 |
| JP | 2001-140305 | 5/2001 |
| JP | 2002-115286 | 4/2002 |
| KR | 10-2012-0070020 | 6/2012 |
| NL | 1017777 | 10/2002 |
| WO | WO-2012/156736 | 11/2012 |

OTHER PUBLICATIONS

International Search Report and Written Opinion mailed May 28, 2014, directed to International Application No. PCT/GB2013/052940; 9 pages.

\* cited by examiner

DEVELOPMENTS RELATING TO WASHING/DRYING STATIONS IN WASHROOMS

REFERENCE TO RELATED APPLICATIONS

This application claims the priority of United Kingdom Application No. 1221731.1, filed Dec. 3, 2012, the entire contents of which are incorporated herein by reference.

FIELD OF THE INVENTION

The present invention relates to the field of washing/drying stations in washrooms.

BACKGROUND OF THE INVENTION

Washrooms are often fitted with hand dryers.

Sometimes the hand dryers are provided as stand-alone hand dryers. Here, a user will typically wash his or her hands at a sink basin and then walk over to the hand dryer—which is often located in some other part of the washroom—to dry the hands.

Other times the hand dryer is integrated as part of a combined washing/drying station which discharges water for washing and then—without the user having to move to some other part of the washroom—discharges an airflow for drying the user's hands.

SUMMARY OF THE INVENTION

The present invention is concerned with combined washing/drying stations.

An object of the present invention is to try to improve installation, repair or servicing of a washing/drying station in a washroom.

According to a first aspect of the present invention there is provided a combined washing/drying station for a washroom, the station comprising a water outlet for discharging water to wash a user's hands, the water outlet being connected to a mains water supply, the station further comprising an air outlet for discharging airflow to dry a user's hands, the airflow being generated by a blower module comprising a motor-driven fan unit, the blower module being connected to a mains electricity supply; said connection to the mains electricity supply being made via a connector unit, the connector unit being hard-wired to the electrical mains and the blower module comprising an electrical connector which connects to an electrical connector on the connector unit for providing power to the fan unit; said connection to the mains water supply being made via the same or an additional connector unit, this connector unit being plumbed into the water mains and incorporating a flow-control valve, an inlet port of the valve being connected to the water mains, an outlet port of the valve being connected to the water outlet.

In accordance with the invention, the fan unit is not hard-wired into the mains electricity supply. Rather, connection to the mains electricity supply is provided via an intermediate connector unit. This connector unit is hard-wired to the mains electricity supply and then electrical connection is made with the fan unit via respective electrical connectors on the blower module and the connector unit.

Similarly, connection to the mains water supply is made via a connector unit. This may be the same connector unit which is used to connect the fan unit to the mains electrical supply, or it may be a separate connector unit. In either case, this connector unit is plumbed into the water mains and incorporates a flow valve for isolating the water mains.

The invention thus makes it straightforward to service or repair the washing/drying station. The fan unit can be disconnected from the mains electrical supply simply by disconnecting the electrical connectors—there is no requirement to interfere with any hard-wiring of components in order to replace the fan unit. On the other hand, repair or replacement of water-circuit components downstream of the flow valve is also simplified because the mains water supply can be isolated at the flow valve, rather than having to locate and close a stop valve in the plumbing system (which may also have the disadvantage of isolating the mains water supply from other washing/drying stations etc.).

The electrical connector on the connector unit may be shrouded for preventing, or at least reducing, accidental physical contact with any live terminal(s) on the connector. This makes it safer to replace the fan unit in the manner just described, without shutting down the main electricity supply at the main circuit breaker.

By "shrouded" is meant that any live terminals on the connector are covered or obscured in some way so that physical access to the live terminal is inhibited. In other words, the live terminal is not an "exposed" live terminal.

Shrouding the electrical connector also allows for a safe 'modular' installation of the relevant components of the washing/drying station. Thus, in accordance with a second aspect of the invention there is provided a method of installing the washing/hand drying station having a shrouded electrical connector on the connection unit, the method comprising: a) hard-wiring the connector unit to the mains electrical supply, b) plumbing in the connector unit to the mains water supply c) engaging the electrical connectors to connect the connector unit to the fan unit and d) connecting the outlet port of the (closed) flow valve to the water outlet.

The installation is modular in the sense that step a) can be carried out independently from step b) and/or step c) can be carried out independently from step d). By "independently" is meant that the steps can be carried out at different times and/or by different persons.

So, for example, steps a) and b) may be carried out during an initial construction phase of a new building, whereas steps c) and d) may be carried out at a more appropriate time in the project e.g. during fitting-out of the building.

Steps a) and b) will likely be carried out by a qualified electrician and qualified plumber. However, following installation of the connector unit(s) in steps a) and b), the electrical mains is then effectively isolated by the shroud on the electrical connector and similarly the water mains is isolated, via the flow valve. Consequently, it may be possible for a general service engineer or installer to carry out steps c) and d) without having to turn off the mains electrical supply or mains water supply. This can reduce cost, particularly in countries with heavily unionized workforces or stringent safety standards, where various temporary permits and permissions must be granted in order to interfere with the utilities to commercial buildings.

Only one connector unit may be provided, with connection to the mains water supply being made via the same connector unit which connects the fan unit to the mains electricity supply. This may simplify and speed-up installation of the connector unit in certain cases. On the other hand, it may be preferable in certain other cases to use separate connector units, for example if regulations in certain countries require installation of the two connector units by different qualified professionals (e.g. qualified electrician and qualified plumber).

The flow valve may be an electrically-actuated flow valve—such as a solenoid valve—which may be triggered automatically in response to a sensor signal generated by one or more sensors.

The connector unit may comprise one or more electrical components which are located inside a sealed compartment inside the connector unit. These may be high-voltage components associated with power supply to the electrical connector and/or low voltage components associated with power supply to the solenoid valve and sensors. The components may be provided on a PCB, which may also incorporate a controller.

Sealing the components inside a compartment helps prevent hazardous contact of water with live components. This is particularly important for high-voltage components.

The sealed compartment may be formed in part by a removable front cover which can be removed for access to the inside of the compartment. In this case, an access panel may be provided in, or as part of, the front cover to allow access to the flow control valve without removing the front cover. This assists with connection of the flow control valve to the water-mains and with subsequent servicing of the flow-control valve, without necessarily having to shut off the mains supply to the connector unit.

The flow valve may be arranged for a push-fit connection to the water outlet. For example, the valve may be provided with a suitable push-fit connector and a piped connection to the water outlet may then be made by push fitting a pipe from the water outlet onto the push-fit connector.

The fan unit may contain a motor with a power rating in excess of 800 W, which may require connection to a "high power" electrical supply in certain countries which run relatively low voltage standard mains electrical supplies.

The electrical connectors may be plug-and-socket or pin-and-socket connectors.

The water outlet may be provided on a water dispensing part and the air outlet may be provided on an air-discharging part. These parts may be incorporated as a single fixture which can be mounted next to the basin of a sink.

The blower module may be arranged for connection to the air outlet via a duct on the connector unit. If the air outlet is provided as part of a fixture, an air hose may be provided to connect the duct on the connector unit to a duct on the fixture.

The air outlet may be an air-knife outlet, possibly in the form of one or more narrow slits.

A filter module may be provided which incorporates an air filter for filtering air drawn in through an air intake on the blower module. The filter module may be releasably connectable to the air intake on the blower module for modular replacement of the filter module.

BRIEF DESCRIPTION OF THE DRAWINGS

Embodiments of the invention will now be described with reference to the accompanying drawings, in which.

DETAILED DESCRIPTION OF THE INVENTION

Combined Washing/Drying Station

Figure 1:
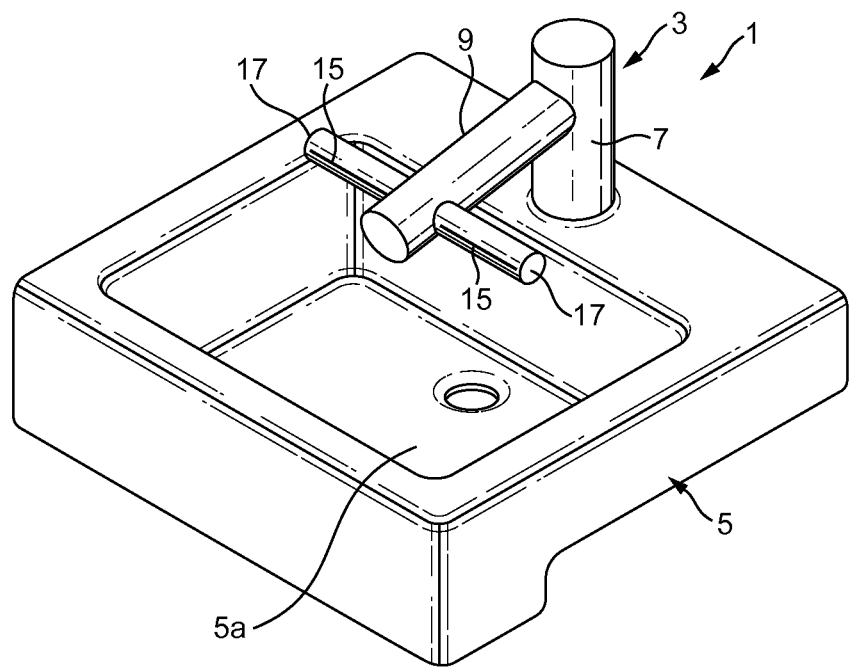
FIG. 1 is a perspective view of a combined washing/drying station in a washroom.
Figure 2:
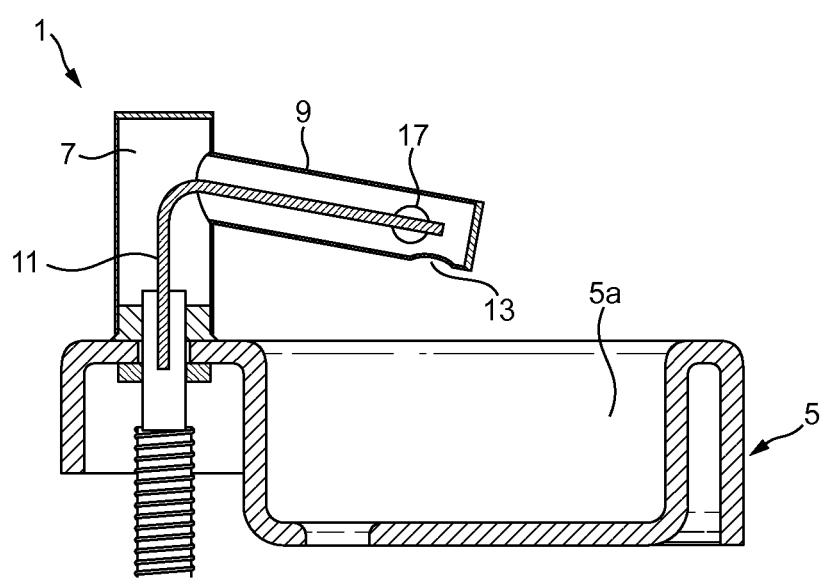
FIG. 2 is a section through the combined washing drying station in FIG. 1.

FIGS. 1 and 2 show a combined washing/drying station 1 in a washroom.

The washing/drying station 1 incorporates a water tap, or faucet, for washing a user's hands and a hand dryer for subsequently drying a user's hands.

The water faucet is incorporated as part of a fixture 3 which is mounted next to the basin 5a of a sink 5.

The fixture 3 comprises a main body 7 which sits adjacent the basin 5a of the sink 5 and a spout 9 which projects from the main body 7 out over the basin 5a of the sink 5.

On demand, water for washing is supplied from a main supply line (not shown) via a water supply pipe 11 (FIG. 2), which runs inside the main body 7 and the spout 9 to a downwardly-facing water outlet 13 (FIG. 2) provided at the fore-end of the spout 9.

The water tap is configured for "hands-free" operation using a conventional sensor and control loop (not shown): water is discharged through the water outlet 13 in response to detection of a user's hands in a washing position. Alternatively, the water tap may be configured for manual operation.

The fixture 3 also comprises an air outlet of the hand dryer, and the hand dryer utilizes the inside of the main body 7 and the spout 9 as an air duct for feeding this air outlet. In this case, there are two air-knife outlets 15 on the fixture— one for each hand. The air-knife outlets are provided either side of the spout 9, extending along supply ducts 17 which branch off from the spout 9.

The hand dryer is configured for "hands-free" operation using a conventional sensor and control loop (not shown), which automatically switches on a fan unit in response to detection of a user's hands in a drying position (distinguishable from the aforementioned washing position). The fan unit then drives an airflow through the fixture 3 and out through the air-knife outlets 15 for drying the user's hands. Alternatively, the hand dryer may be configured for manual operation.

Figure 5:
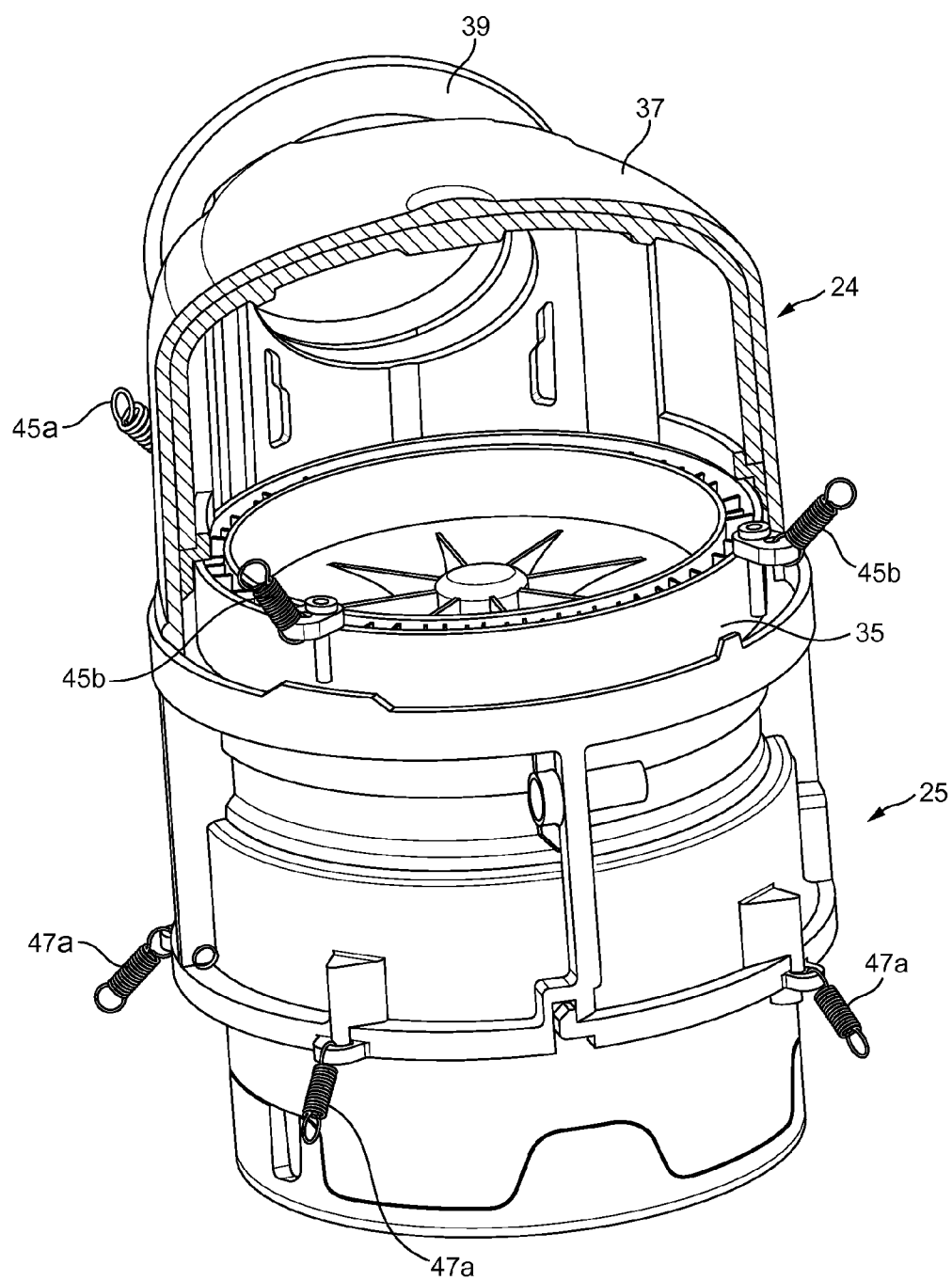
FIG. 5 is a part-sectioned perspective view of a fan unit.

The fan unit 24 is shown in isolation in FIG. 5, It forms part of a lower assembly which is hidden away under the countertop in FIGS. 1 and 2. You can see the lower assembly 16 in FIG. 3. It comprises three modular components: a connector unit 19, a filter module 21 and a blower module 23 which comprises the fan unit.

The Fan Unit

The fan unit 24 comprises a centrifugal blower, or compressor, 25.

Figure 4:
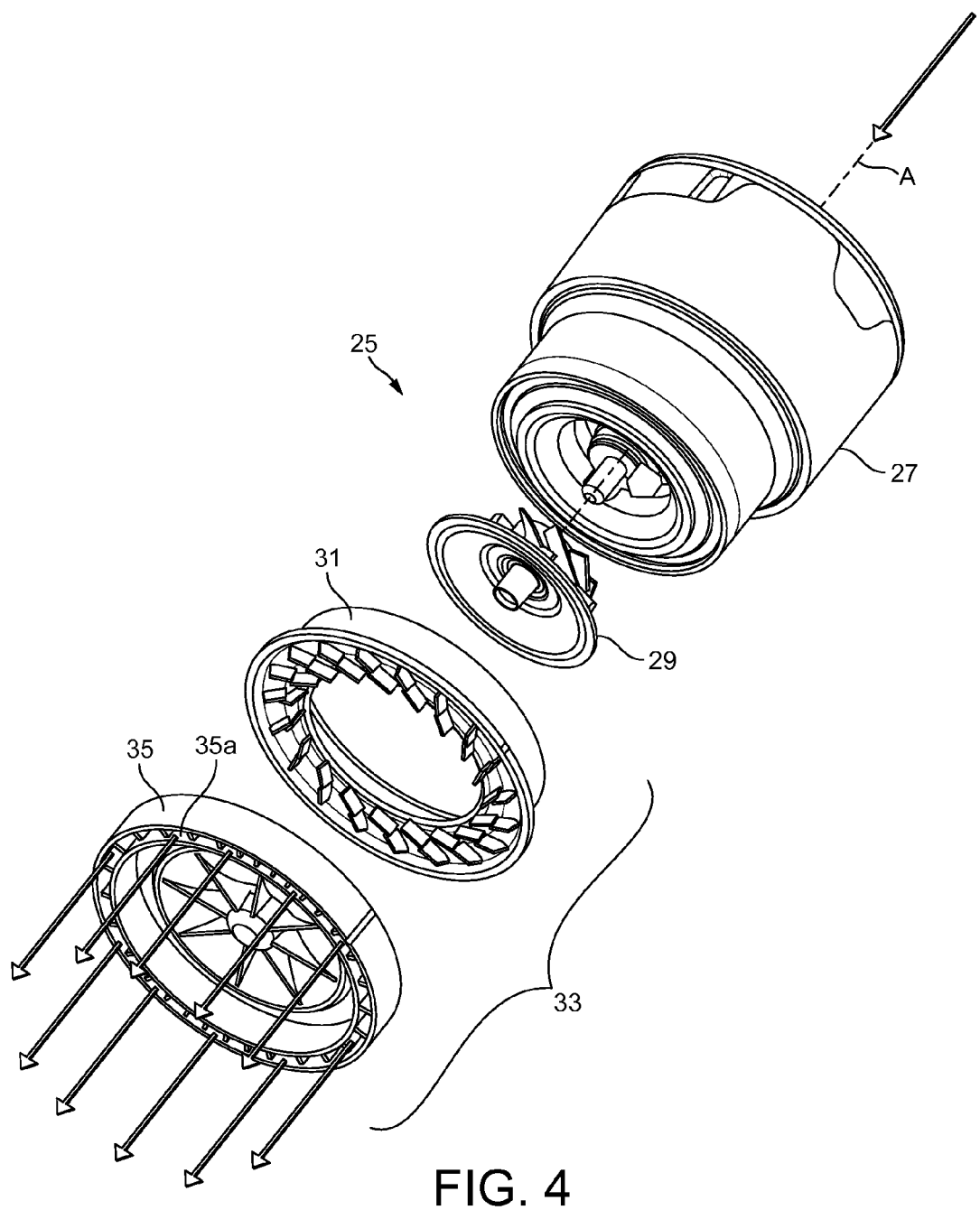
FIG. 4 is an exploded view of a blower, or compressor.

An exploded view of the centrifugal blower 25 is shown in FIG. 4. It comprises a drive unit 27 incorporating an electric motor (not shown), a centrifugal fan impeller 29 which connects to the output shaft of the motor, and a diffuser 33.

Figure 6:
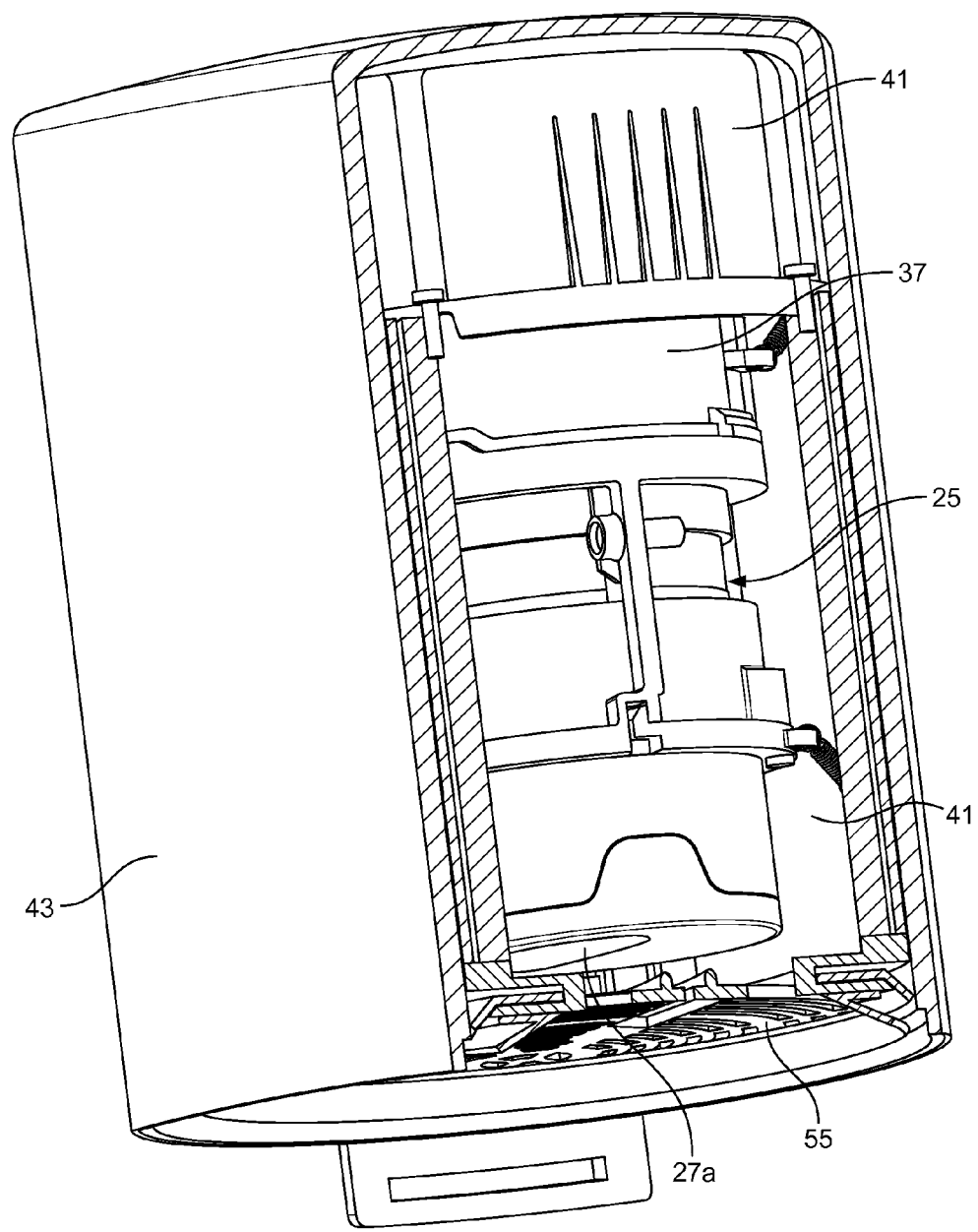
FIG. 6 is a part-section perspective view of a blower module—incorporating the fan unit—forming part of the arrangement in FIG. 3.

Air is drawn axially into the blower 25 by the fan impeller 29, through an air intake 27a on the drive unit 27 (the air intake 27a is not visible in FIG. 4, but is just visible in FIG. 6).

The diffuser 33 comprises a diffuser ring 31, incorporating a number of swirl vanes for static pressure recovery, and a diffuser cap 35 which fits onto the diffuser ring 31 and which channels airflow from the impeller 29 out through an annular fan outlet 35a, as indicated by the arrows (in use, there will be a certain degree of residual swirl to the airflow as it leaves the fan outlet 35a—not illustrated in FIG. 4).

The fan unit 24 also comprises a manifold 37 which fits onto the diffuser cap 35. You can see this in FIG. 5. The manifold 37 collects the airflow and discharges it radially through a nozzle 39 on the side of the manifold 37 (see also FIG. 7).

The fan unit 24 is spring-mounted vertically inside a motor bucket 41 fixed to an external casing 43 of the blower module 23, with the fan outlet 35a facing upwards (see FIG. 7), the air intake 27a facing downwards (FIG. 6) and the rotation axis A of the impeller (hereafter the "fan axis") extending vertically.

Figure 8:
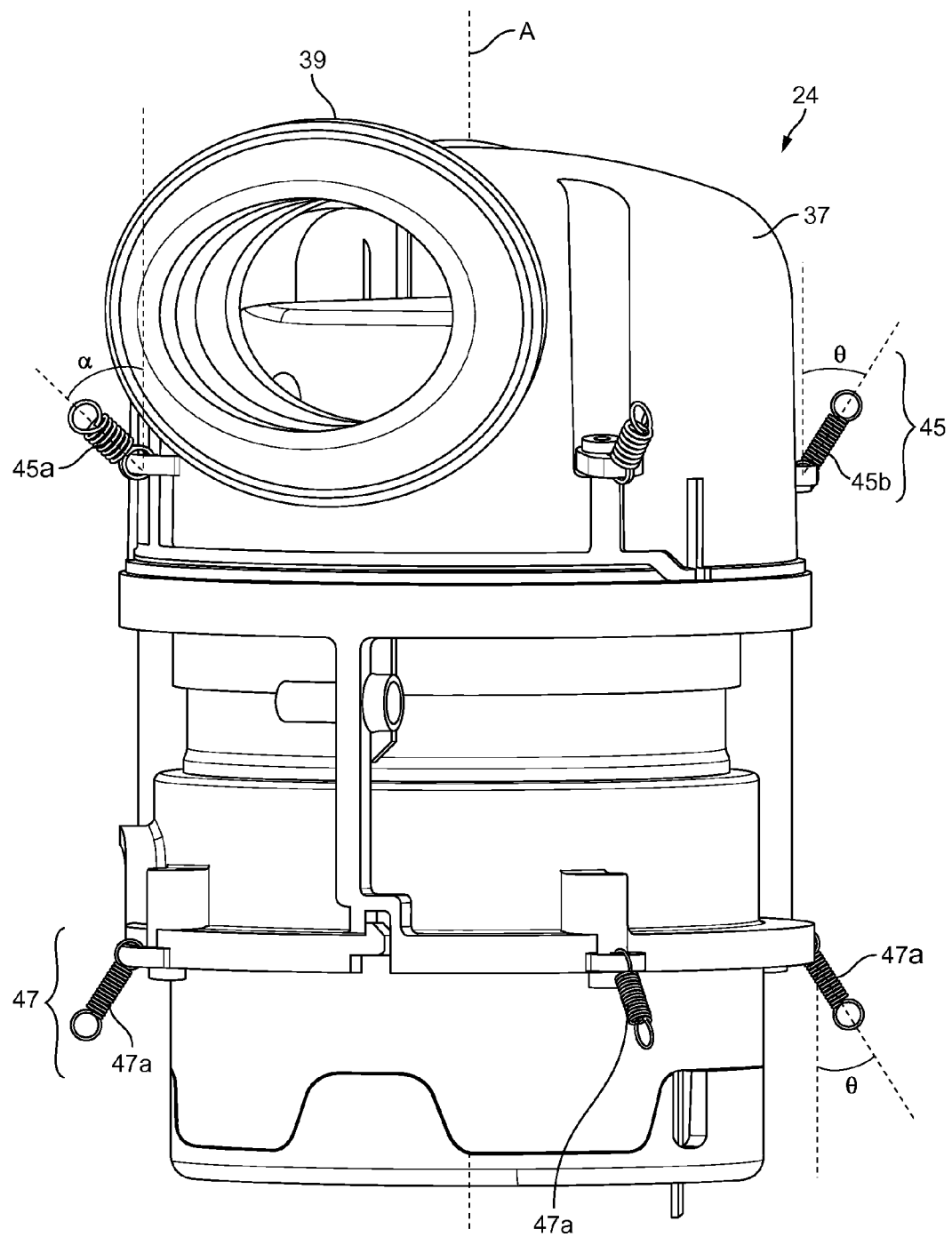
FIG. 8 is a perspective view of the fan unit in isolation, illustrating the configuration of the spring-mounting arrangement.

The spring mounting arrangement comprises an upper set of springs 45 and a lower set of springs 47, spaced axially (along the fan axis) from the upper set of springs 45. You can see these sets of springs clearest in FIG. 8.

The lower set of springs 47 comprises four coil extension springs 47a (three of which are visible in FIG. 8) spaced equi-angularly around the fan axis A. Each spring 47a extends along the fan axis A at a plane angle θ to the fan axis, in this case 30 degrees. The lower set of springs is thus arranged in a frusto-conical configuration, with cone angle θ=30°. The frusto-conical configuration allows the springs 47a to resist a load having both an axial and a radial component. The springs 47a have the same spring constant k=1.1 N/mm, and the same length l=12.7 mm in order to provide a uniform load bearing response.

Figure 9:
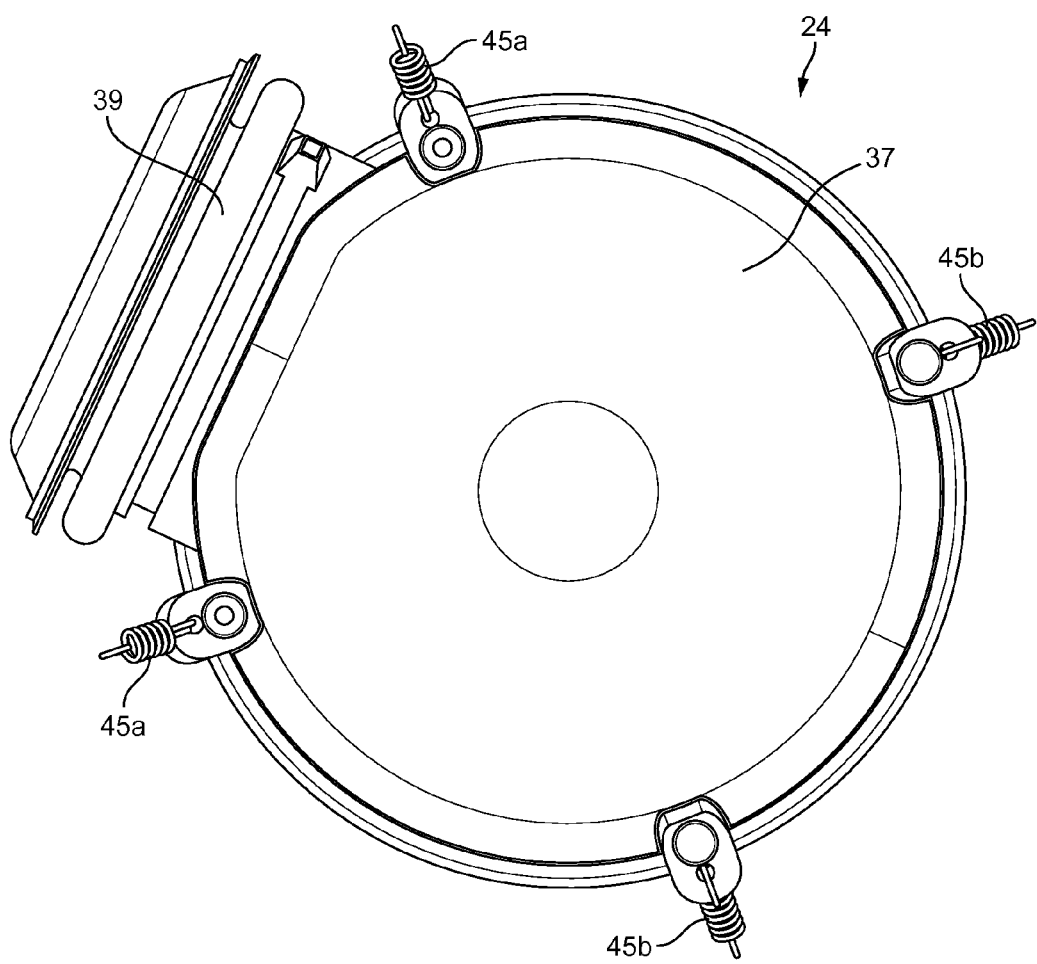
FIG. 9 is a plan view corresponding to FIG. 8.

The upper set of springs 45 likewise comprises four coil extension springs spaced equi-angularly around the fan axis. The springs are arranged into two groups of two: two relatively stiff springs 45a (k=7.5 N/mm, l=12.7 mm) and two relatively weak springs 45b (k=1.1 N/mm, l=12.7 mm). You can see the two groups of springs in FIG. 9.

The two relatively weak springs 45b are arranged in a first frusto-conical configuration, having a cone angle θ=30°, which configuration is inverted with respect to the frusto-conical configuration of the first set of springs to provide bi-directional axial support for the fan unit 24.

The two relatively stiff springs 45a are arranged in a second frusto-conical configuration. The cone angle ∞ of this second frusto-conical configuration—corresponding to the plane angle ∞ of the springs 45a to the fan axis A—is different from the cone angle θ of the first frusto-conical configuration. In this case ∞=50°

The stiff springs 45a are arranged on the same side of the fan unit 24 as the discharge nozzle 39 in the manifold 37. The weak springs 45b are arranged on the opposite side of the fan unit 24. This provides the upper set of springs 45 with a bi-directional asymmetric response characteristic: the stiff springs 45a provide a 'hard' response characteristic in order to resist the lateral recoil force on the fan unit 24 as airflow is discharged through the nozzle 39—in particular to control the "kick" of the fan unit 24 on start-up—whereas the relatively weak springs 45b provide a more compliant, 'soft' response characteristic in the opposite direction, better suited for damping smaller amplitude vibrations which occur in the steady state following the start-up phase of the blower 25.

Compression springs may be used instead of extension springs, but extension springs provide the advantage of a relatively short unloaded length.

Figure 7:
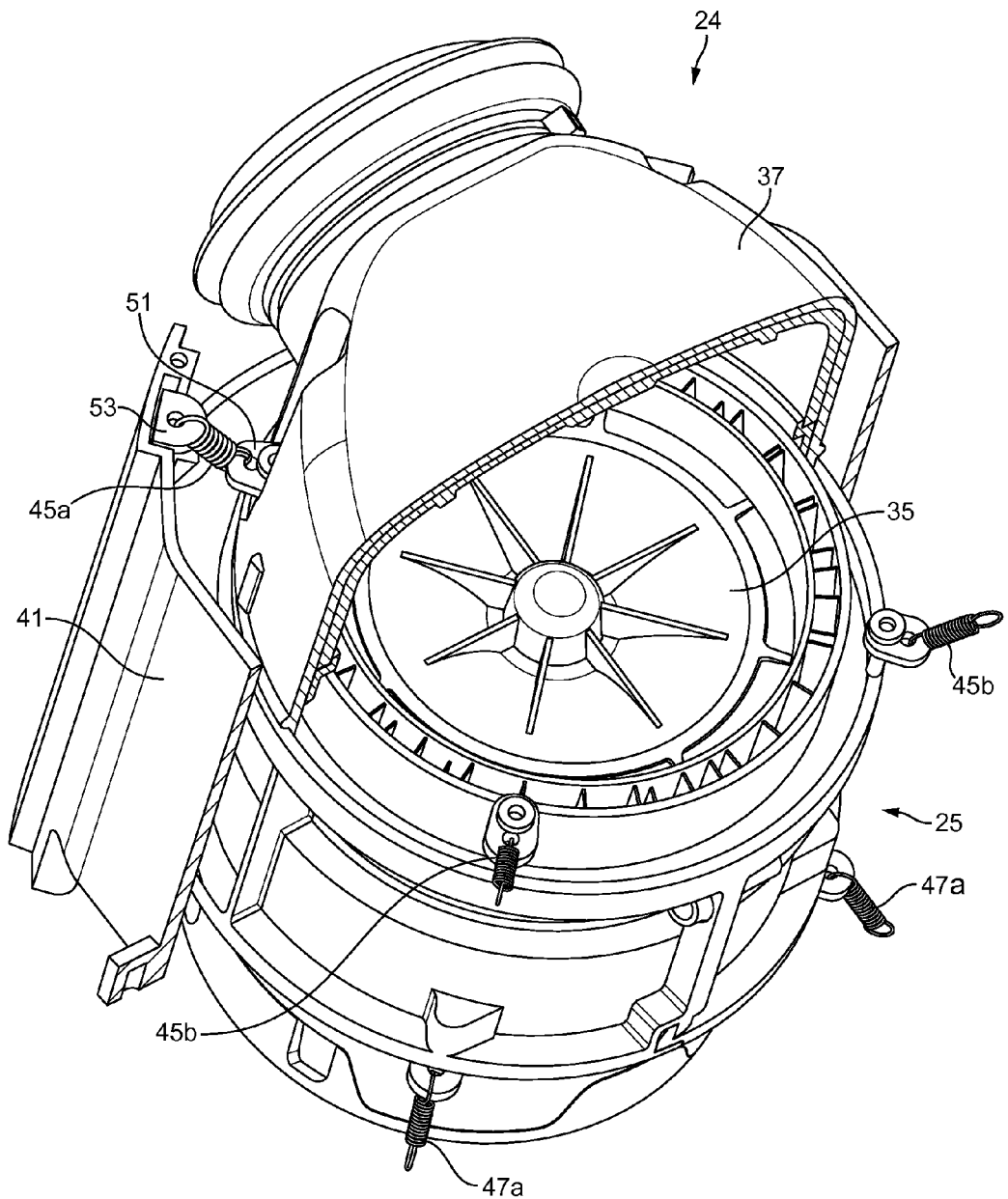
FIG. 7 is a part-sectioned perspective view illustrating spring-mounting of the fan unit inside the blower module.
Figure 10:
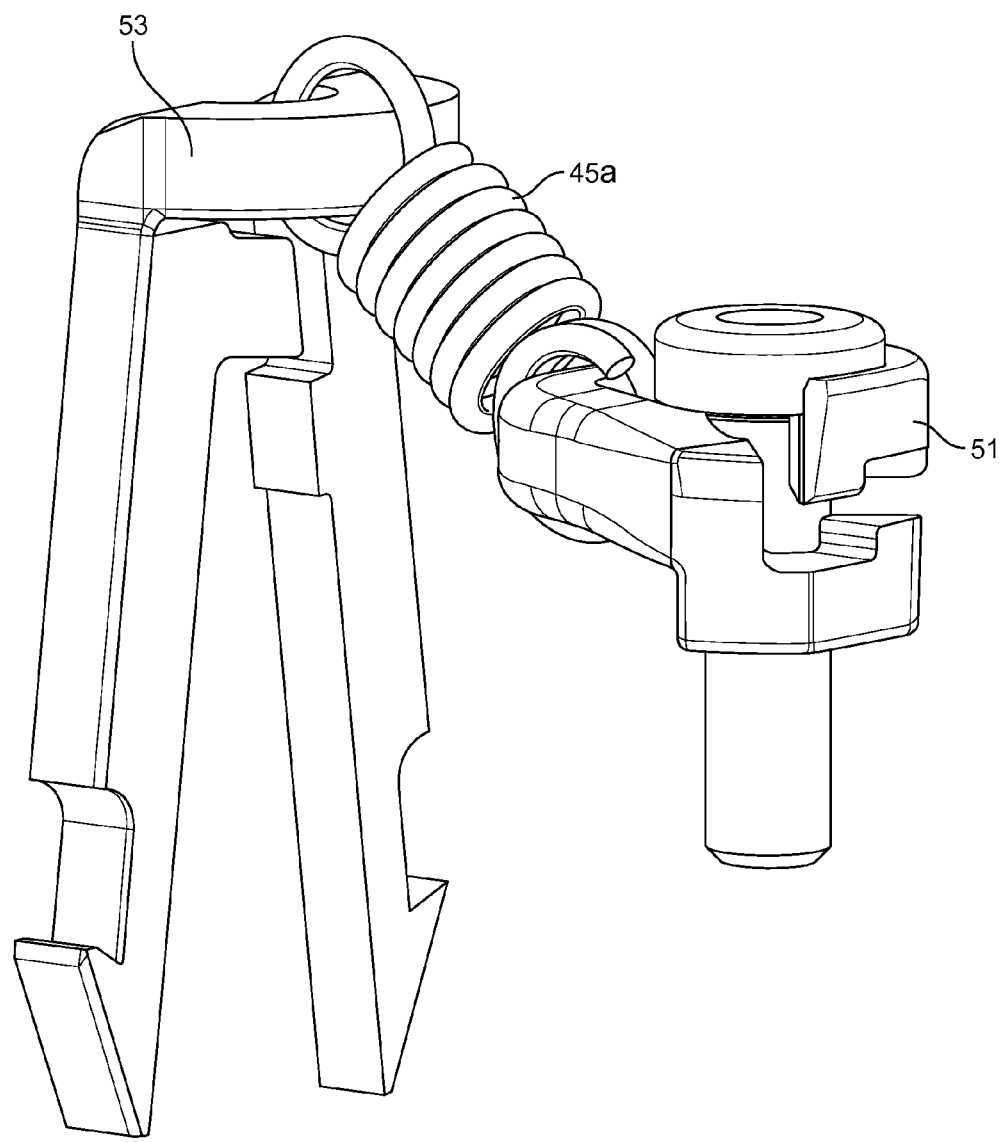
FIG. 10 is a close-up view of the mounting arrangement for one of the springs shown in FIGS. 8 and 9.

The springs 45a, 45b, 47a are coil-bound in their unloaded state, to minimize the unloaded length of the springs. To reduce compressive loading on the springs each spring 45a, 45b, 47a is pivotally mounted at both ends. The mounting arrangement is shown in FIGS. 7 and 10, in this case for one of the stiff springs 45a. The same arrangement is used for each of the other springs 45b, 47a. The spring 45a has looped ends, and is secured in place at one end by a washer 51 which is screwed down onto the fan unit 24 and at the other end by a snap ring 53 which snap-fits into a channel formed in the wall of the motor bucket 41. This arrangement permits a degree of pivoting movement of the spring 45a to allow relative displacement of the motor bucket 41 and fan unit 24 without imposing excessive compressive load on the spring 45a.

The motor bucket 41 is housed inside the external casing 43 of the blower module 23. A grille 55 (FIG. 6) is provided on the bottom of the motor bucket 41—near to the air intake 27a on the fan unit 24—which acts as the air intake for the blower module 23.

The Filter Module

Figure 11:
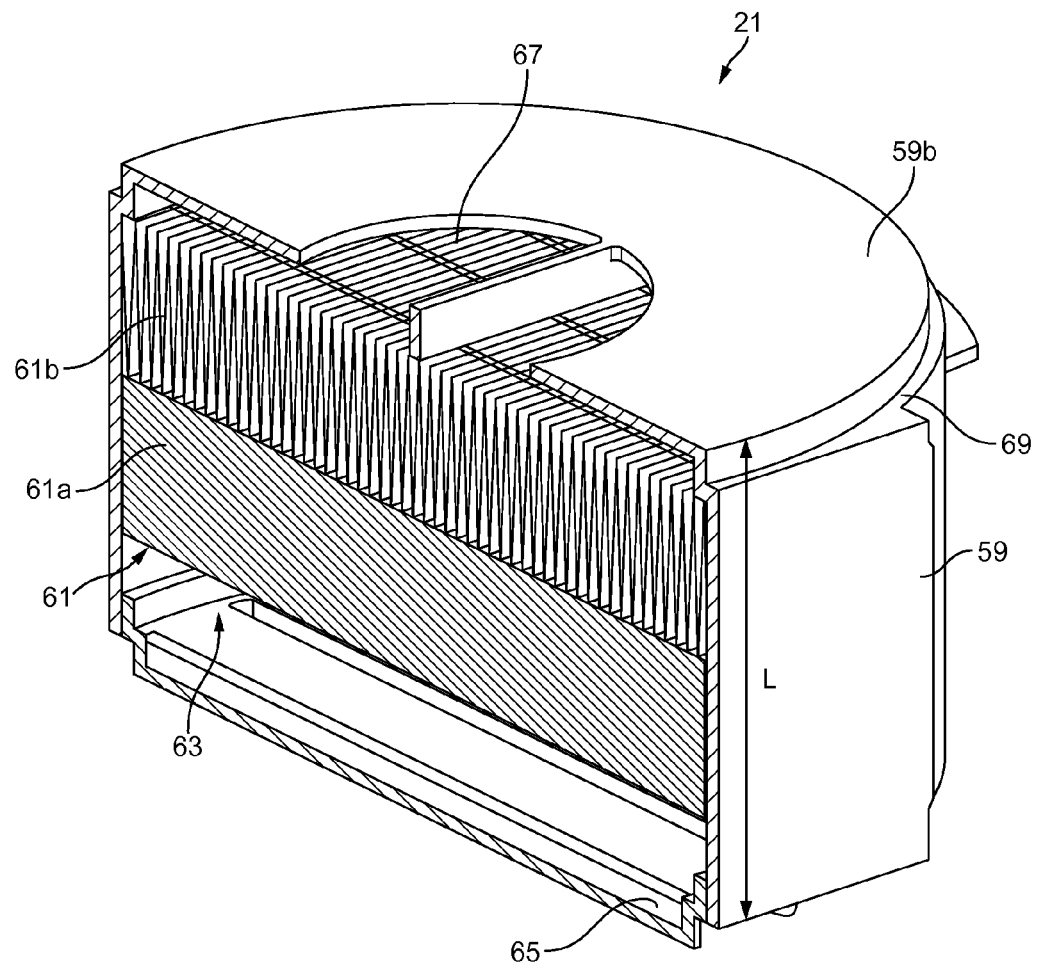
FIG. 11 is a sectional perspective view of a filter module for use in the arrangement shown in FIG. 3.
Figure 12:
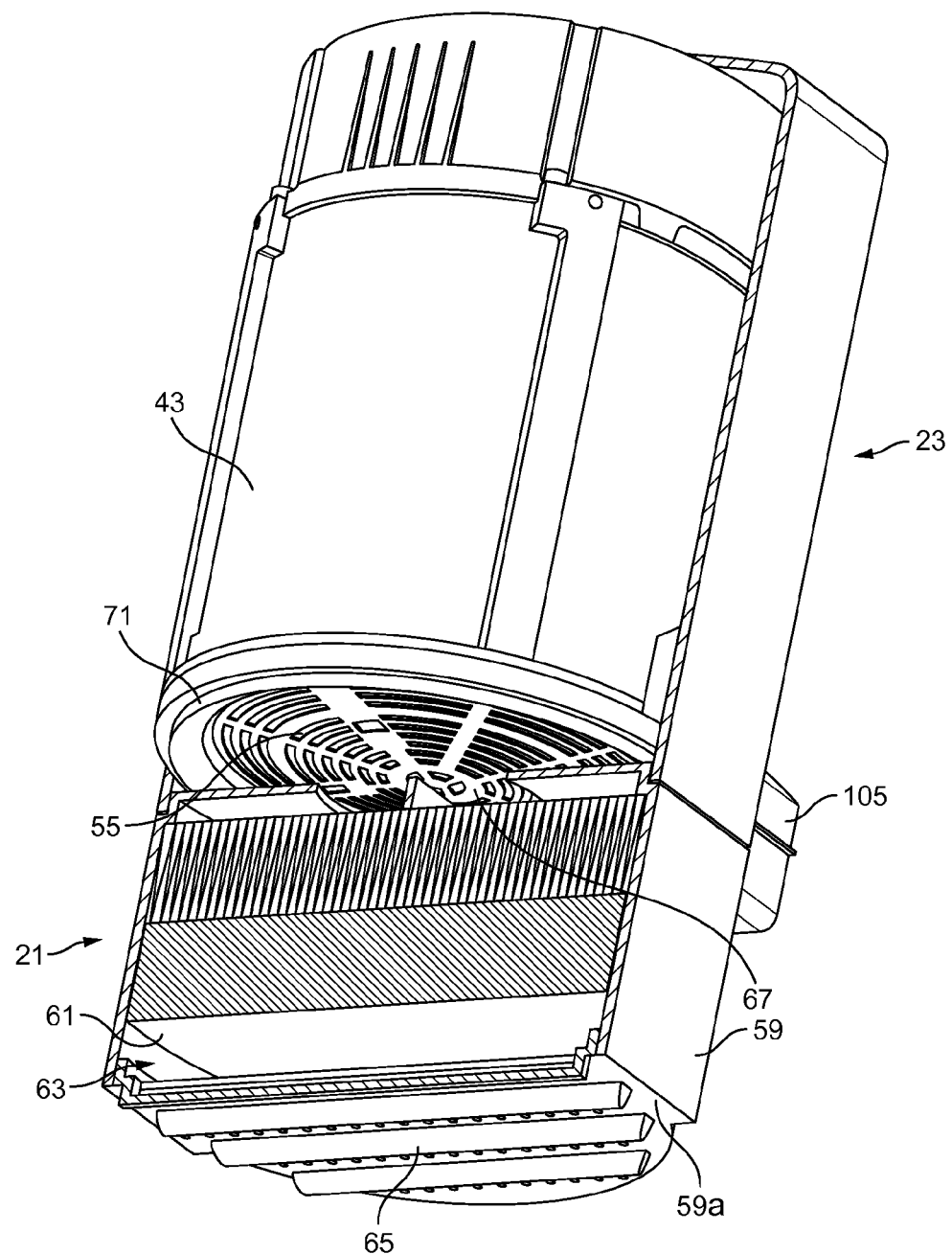
FIG. 12 is a part-sectioned perspective view showing attachment of the filter module to the blower module.
Figure 13:
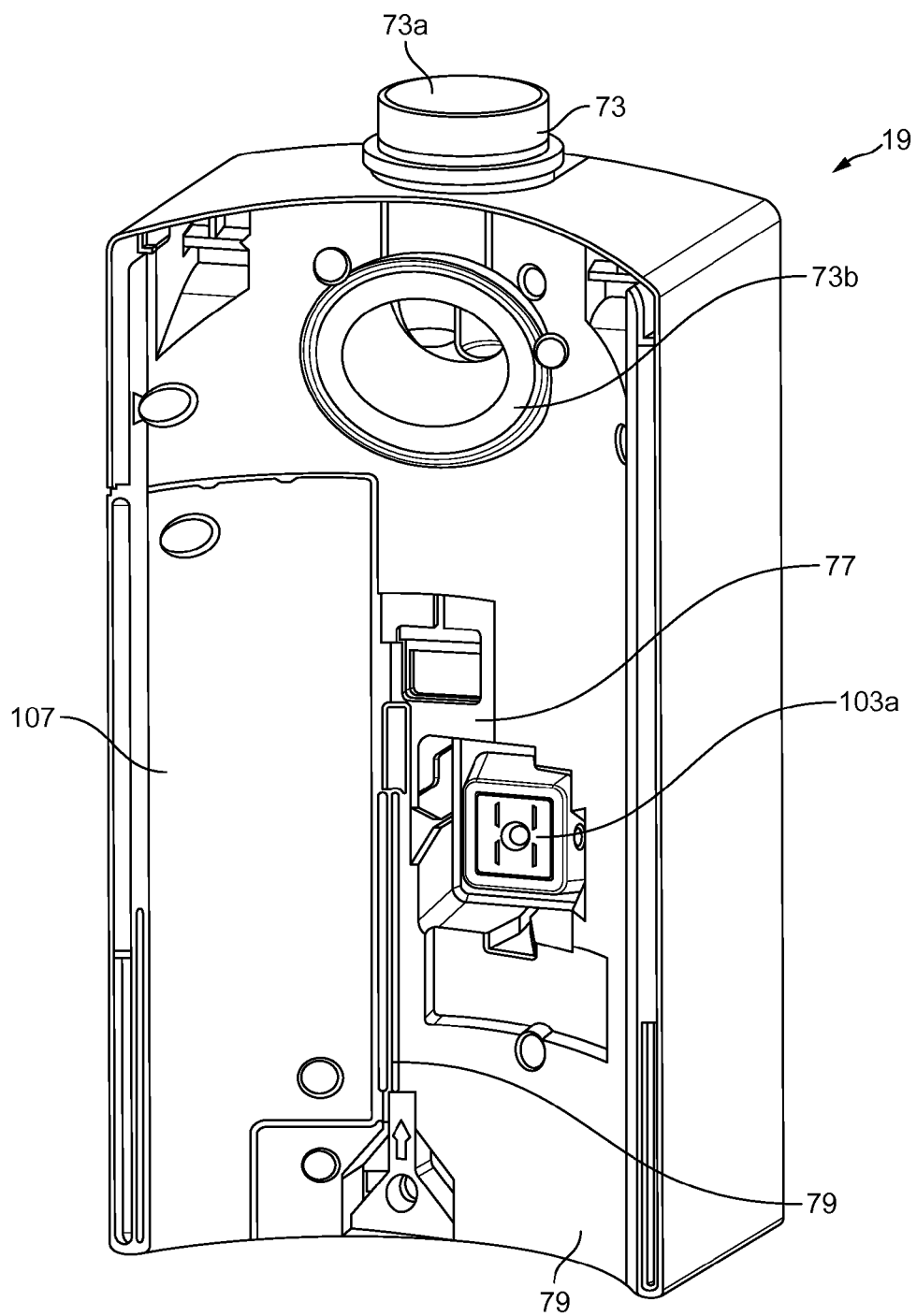
FIG. 13 is a perspective view of a connector unit used in the arrangement of FIG. 3.

The filter module 21 is shown in isolation in FIG. 11 and connected to the blower module 23 in FIG. 12.

The filter module 21 comprises a filter casing 59 which houses a filter 61.

The filter casing 59 comprises a chamber 63. At one end of the chamber 63 is an airflow inlet, formed in a lower end face 59a of the casing 59. At the opposite end of the chamber 63 is an airflow outlet, formed in an upper end face 59b of the casing 59.

The airflow inlet to the filter casing 59 is a "louvred" inlet comprising a series of intake slots 65. The airflow outlet is a circular outlet 67 formed at the centre of the upper end face 59b.

The upper end face 59b is rebated around its perimeter for mating engagement with the lower end of the blower module 23 in use (you can see the rebate 69 best in FIG. 11). A seal 71 around the perimeter of the grille 55 seals against the upper end face 59b of the filter casing 59, around the outlet 67. Airflow is thus drawn in to the blower module 23 via the chamber 63 inside the filter casing 59, passing into the blower module 23 through the airflow outlet 67 and the grille 55. The filter module 21 is provided with a catch 73 (FIG. 3) which catches against a catch surface on the blower module 23 to secure the filter module 21 to the blower module 23.

The filter 61 is arranged inside the filter casing 59 so that it partitions the chamber 63—the filter 61 does not merely line the chamber 63. Thus, airflow passing through the chamber 63 necessarily passes through the filter 61.

The filter 61 is a HEPA filter, comprising a layer of fleece 61*a* and a layer of HEPA media 61*b*, such as Technostat™. The precise configuration of the filter 61 may vary.

The chamber 63 acts as an expansion chamber which helps to muffle sound propagation back through the grille 55, originating from the fan unit 24 (the sound will propagate in the opposite direction to the airflow).

Initial tests suggest that the acoustic impedance of the filter 61 has a beneficial effect on acoustic performance by reducing the low-pass cut-off frequency of the expansion chamber so that the acoustic impedances of the expansion chamber 63 and the filter 61 interact to provide a better performing low-pass acoustic filter. This reduction in the cut-off frequency helps to suppress low frequency noise transmission externally through the intake slots 65.

The reduction in the cut-off frequency is achieved without compromising the exit airspeed at the air-knife outlets 15 by taking advantage of the inherent acoustic impedance of the filter 61 inside the hand dryer, and without having to increase the overall length L of the expansion chamber 63.

The Connector Unit

The connector unit 19 is arranged to be mounted on a wall using conventional wall fixings. Generally, the connector unit 19 will be located under the countertop and will therefore be hidden away from the user.

The connector unit 19 acts as a hub for various connections. Firstly, the connector unit 19 connects the water outlet 13 on the fixture 3 to the mains water supply (not illustrated). Secondly, the connector unit 19 connects the blower module 23 (and various other components) to the mains power supply (not illustrated). Thirdly, the connector unit 19 connects the air-knife outlets 15 on the fixture 3 to the discharge nozzle 39 on the fan unit 24.

Air Connection

Figure 3:
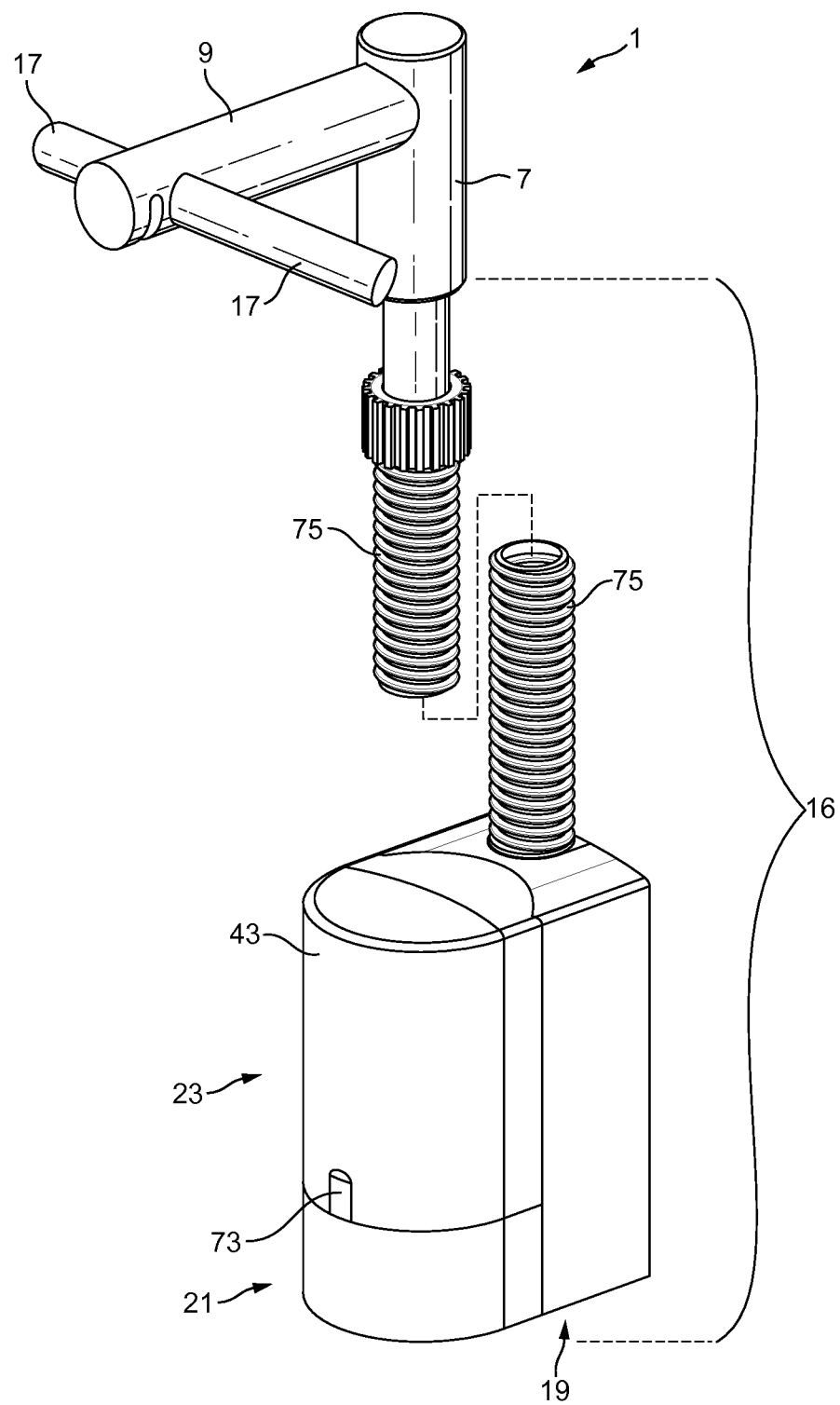
FIG. 3 is a perspective view of an arrangement for use in the combined washing/drying station in FIG. 1.
Figure 14:
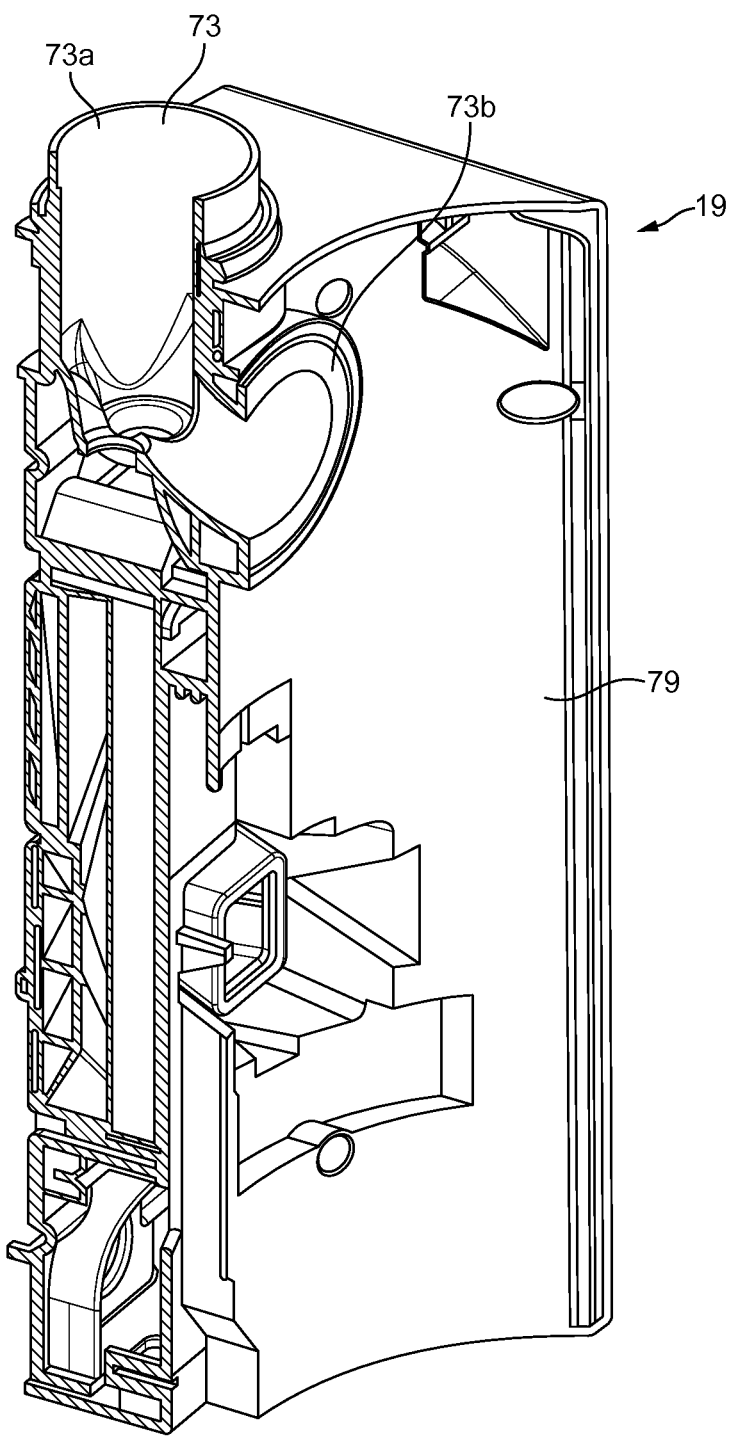
FIG. 14 is a sectional perspective view through the connector unit in FIG. 13.

The air-knife outlets 15 are connected to the discharge nozzle 39 on the fan unit 24 via an elbow duct 73, which runs through the top of the connector unit 19. You can see this elbow duct in FIG. 14. The air-knife outlets 15 connect to one end of the elbow duct 73 via an air hose 75 (FIG. 3). This air hose 75 is connected at its upper end to the main body 7 of the fixture 3 (underneath the countertop in FIG. 1) and at its lower end to the end 73*a* of the elbow duct 73. The discharge nozzle 39 on the blower module 23 seals against the opposite end 73*b* of the elbow duct 73, via a flexible seal.

In use, air is discharged from the blower module 23 into the elbow duct 73 and is then carried up the air hose 75 to the hollow main body 7, before eventually being forced out through the air-knife outlets 15.

A resilient, sliding catch 77 is provided on a front cover 79 of the connector unit 19. The catch 77 is spring-biased for locking engagement with a catch projection (not shown) on the blower module 23 in order to secure the blower module 23 on the connector unit 19. The catch 77 holds the discharge nozzle in sealing engagement with the respective end 73*b* of the elbow duct 73.

A push rod 79 is provided for manual release of the catch; the push rod 79 is hidden in use behind the blower module 23 and the filter module 21 to discourage tampering, but can be accessed from underneath the connector unit 19 to release the catch 77 as required to remove the blower module 23.

Water Connection

Connection to the mains water supply is via an electrically-actuated flow valve—in this case a solenoid valve 81—which is housed inside the connector unit 19. The inlet port 81*b* of the solenoid valve 81 is arranged to be plumbed into the mains water supply and—once it is plumbed in—the solenoid valve 81 acts as a flow valve which isolates the mains water supply at the connector unit 19.

Figure 15:
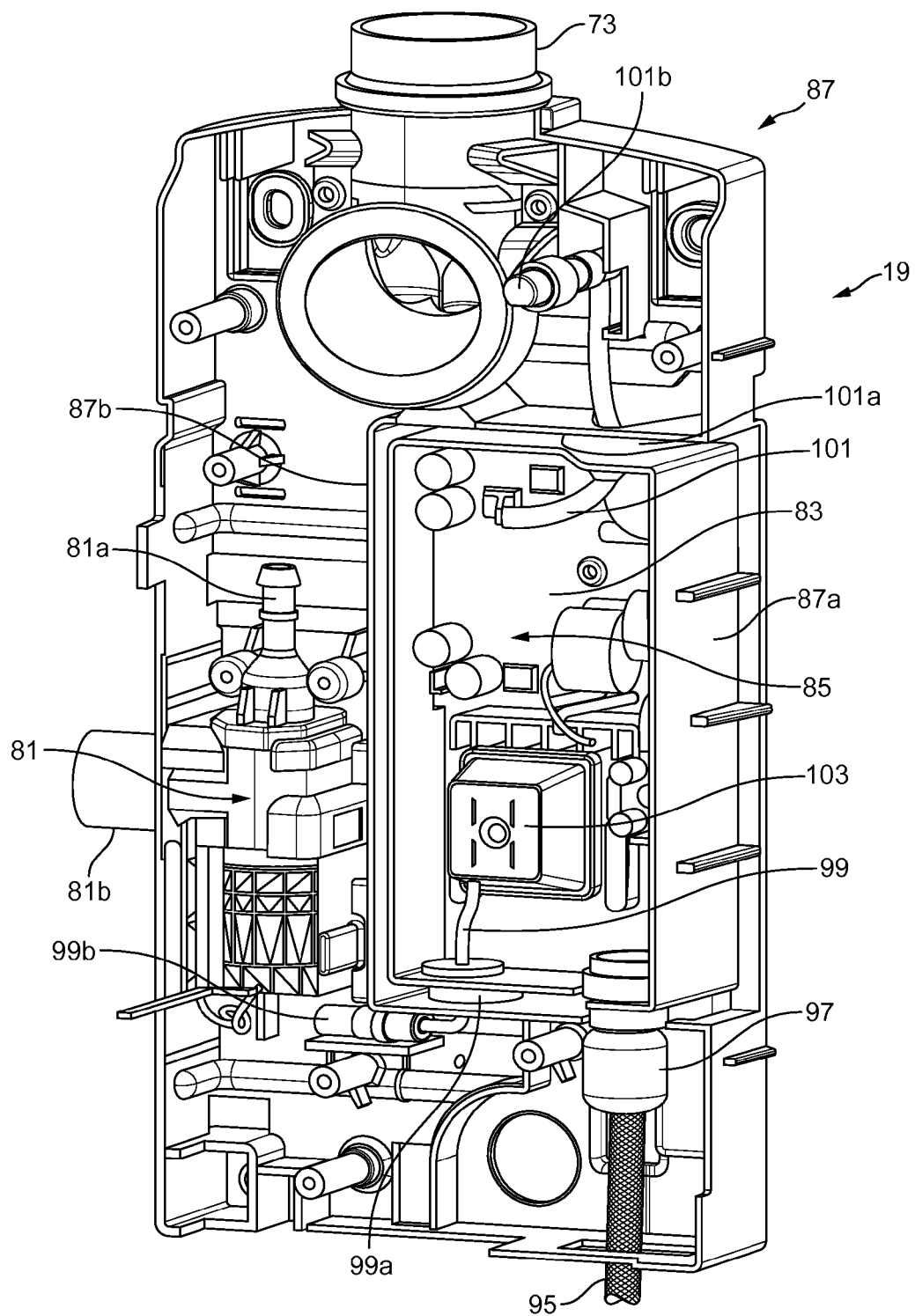
FIG. 15 is a perspective view of a back plate forming part of the connector unit, including some components mounted onto the back plate.

The water outlet 13 connects to the outlet port 81*a* of the solenoid valve 81 via the flexible water supply pipe 11 (FIG. 2), which runs down through the inside of the air hose 75 and is routed externally through a hole in a wall of the elbow duct (the flexible supply pipe is not actually shown in FIG. 15). A sealing grommet is used to provide a functioning air-seal between the wall of the elbow duct 73 and the flexible water supply pipe 11.

The flexible water supply pipe 11 engages with the outlet port 81*a* of the solenoid valve 81 in a conventional push-fit.

Power Connections

Power connections are made via a PCB 83 housed inside the connector unit 19.

The PCB 83 is housed inside a sealed "dry compartment" 85 inside the connector unit 19. This configuration isolates the PCB 83 from the solenoid valve 81. Consequently, if the solenoid valve 81 is faulty then water cannot easily leak onto the PCB 83.

Figure 16:
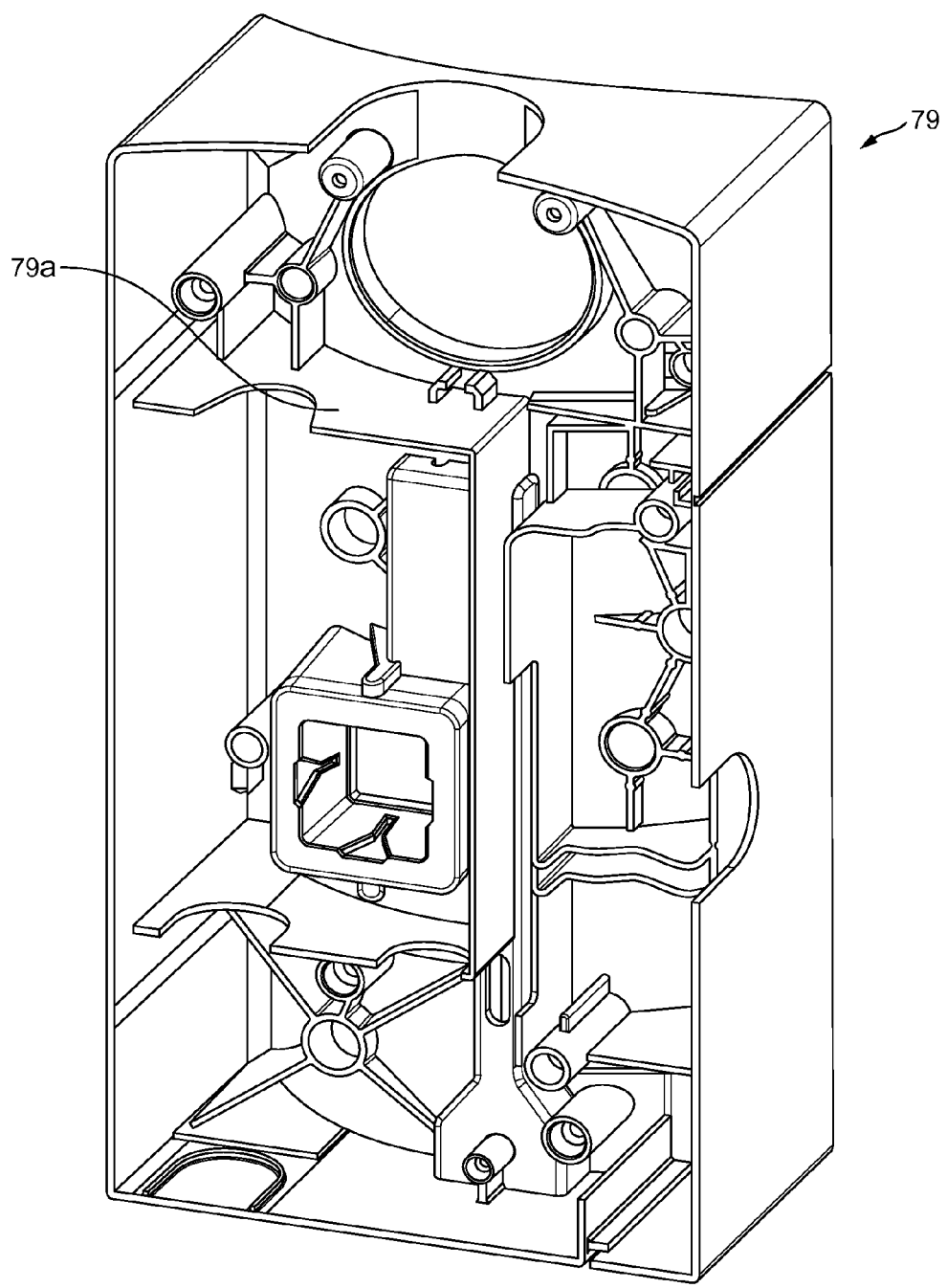
FIG. 16 is a perspective view of a front cover forming part of the connector unit, showing the inside of the front cover.

The compartment 85 is a two-part assembly. The first part of the compartment 85 comprises a rectangular, inner perimeter wall 87*a* provided on a back-plate 87 of the connector unit 19. The PCB 83 and other electrical components are mounted on the back-plate 87, inside the boundary of this perimeter wall 87*a*. The second part of the compartment 85 is provided on the inside of the front cover 79 of the connector unit 19 (FIG. 16), which fits over the back-plate 87. The second part of the compartment comprises a perimeter wall 79*a* which fits around the outside of the perimeter wall 87*a* on the back-plate 87 so that the two perimeter walls 79*a*, 87*a* form a perimeter labyrinth seal. This effectively seals the compartment 85 against water ingress.

As an additional precaution against water ingress, an outer perimeter wall 87*b* is provided on the back-plate 87. This outer perimeter wall 87*b* extends around the outside of the perimeter wall 79*a* on the front cover 79, so that the three perimeter walls 79*a*, 87*a*, 87*b* together form a double labyrinth seal around the perimeter of the compartment 85. In this particular arrangement, the outer perimeter wall 87*b* only extends on three sides of the inner perimeter wall 87*a*—because the fourth side of the intermediate perimeter wall 79*a* forms part of an external wall of the connector unit 19—but an outer perimeter wall may alternatively be provided which extends all the way around the respective inner perimeter wall, as appropriate.

Figure 17:
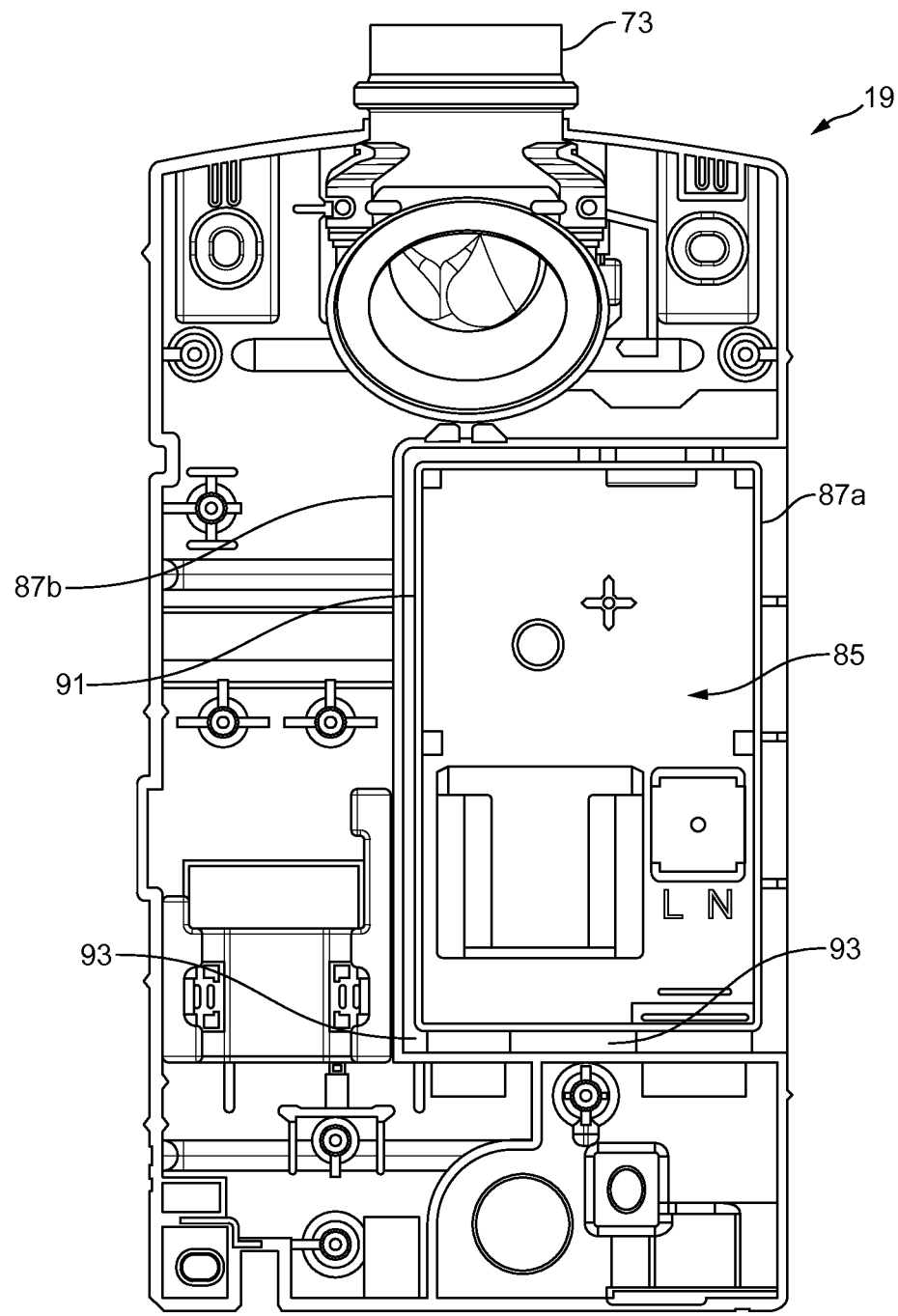
FIG. 17 is a frontal view of the back plate in FIG. 15, but with some of the mounted components removed, for clarity.

A gasket 91 is provided on the back-plate 87 (FIG. 17), running in the channel between the inner perimeter wall 87*a* and the outer perimeter wall 87*b*. This gasket 91 forms a seal against the end of the intermediate perimeter wall 79*a*, to further reduce the chances of water ingress through the labyrinth seal. The gasket 91 may extend all the way round the perimeter of the compartment 85, but in this case only extends part-way around the perimeter to allow for the positioning of drain outlets 93 between the inner and outer perimeter wall 87*a*, 87*b*. These drain outlets 93 act as overflow outlets which prevent the compartment 85 from filling up with water in the event that there is a sealing failure somewhere around the perimeter of the compartment 85. The drain outlets 93 are located so that they are at the bottom of the compartment 85 when the connector unit is in its normal orientation in use (the orientation shown in FIGS. 14-17).

A high-voltage side of the PCB 83 is hard-wired to the mains power supply via a mains wiring loom 95 which runs externally through a cable gland 97 in the perimeter wall(s) of the compartment 85. The cable gland 97 seals around the loom 95 to prevent water ingress into the compartment 85.

In the present context, the term "hard wired" is intended as a catch-all term to cover any permanent or semi-permanent electrical connection. The connection need not be via wiring, specifically.

The solenoid 81, and a sensor on the fixture 3, connects to a low-voltage side of the PCB 83 inside the compartment 85, via respective wiring looms 99, 101 which run externally through sealing grommets 99a, 101a to prevent water ingress into the compartment 85. Connection to the solenoid 81 and sensors is via respective plug connectors 99b, 101b provided at the end of the wiring looms 99, 101—neither the solenoid 81 nor the sensors are hard-wired to the PCB 83. This allows easy disconnection of the sensors and solenoid 81 for maintenance or replacement.

Similarly, the blower module 23 is not hard-wired to the PCB 83. Instead, connection is via a pin socket 103 which is hard-wired to the high-voltage side of the PCB 83. A complementary pin connector 105 (just visible in FIG. 12) is provided on the blower module 23, which plugs into this pin socket 103. This arrangement allows easy disconnection of the blower module 23 from the mains power supply for ease of servicing and replacement.

The pin socket 103 is shrouded. The shroud 103a—in this case a rubber mask—helps prevent water ingress in the event of failure of the solenoid valve 81, but also helps prevent accidental contact with the high-voltage live terminals of the pin socket 103 in the absence of the blower module 23.

Installation/Servicing

Installation of the connector unit 19 requires connection of the high voltage side of the PCB 83 to the mains power supply and connection of the solenoid valve 81 to the mains water supply.

Connection of the high voltage side of the PCB 83 to mains-power requires removal of the front cover 79 of the connector unit 19 to access the inside of the compartment 85. This is preferably therefore carried out prior to connecting the solenoid valve 81 to the mains-water supply to prevent risk of water contacting live components.

Once the front cover 79 is replaced, the compartment 85 is sealed against water ingress, and subsequently connection to the mains-water supply can safely be made without shutting off mains power to the connector unit 19. This may be particularly advantageous in large commercial buildings, where permits may be required to shut off the mains power; here, it may be desirable to connect to the mains water supply sometime after initial connection to the mains power supply—using a qualified plumber as opposed to a qualified electrician—and the cost of seeking multiple permits to shut off the mains power may be burdensome.

Installation of the connector unit 19 may form part of an initial installation phase, for example during the construction phase of a new building. It may be preferable in such circumstances to delay installation of the fixture 3 until "fitting out" the building. In the meantime, the solenoid valve 81 effectively isolates the connector unit from the mains water supply and the shrouded pin socket 103 reduces the risk of physical contact with the live terminals.

An access panel 107 is provided in the front cover 79 of the connector unit 19 to provide access to the solenoid valve 81 without removing the front cover 79. During subsequent installation of the fixture 3, this panel 107 provides access for push-fitting the water supply pipe 11 onto the outlet port 81a of the solenoid valve 81.

The low-voltage plug connectors 99b, 101b are also accessible through the access panel 107 and can be connected to the solenoid 81 and sensor cable (not shown), again without removing the front cover 79 of the connector unit 19.

The air hose 75 connects externally to the elbow duct 73 and so no access inside the connector unit 19 is required to fit the air hose. The air hose 75 may simply be secured in place using one or more cable ties (not shown).

The blower module 23 and filter module 21 is installed simply by docking it with the connector unit 19. The pin connector 105 engages the pin socket 103 to provide mains power to the fan unit 24. The discharge nozzle 39 engages the end of the elbow duct 73 for connecting the fan unit 24 to the air-knife outlets 15 on the fixture 3. The blower module 23 is held in position by the resilient catch 77 on the connector unit 19.

The blower module 23 is preferably installed after the fixture 3, so that the blower module 23 does not hinder access to the access panel 107, but where the blower module 23 has already been installed it may easily be removed to allow installation of the fixture 3, simply by releasing the catch 77 on the connector unit 19.

Following installation, the access panel 107 provides access for maintenance, servicing or repair of the solenoid valve 81 without removing the front cover 79.

The invention claimed is:

1. A combined washing/drying station for a washroom, the station comprising:
    a blower module for generating an airflow;
    a connector unit, the connector unit having a first electrical connector hard-wired to a mains electricity supply and a flow-control valve plumbed into a mains water supply;
    a water-dispensing part having a water outlet arranged for connection to an outlet port of the flow control valve; and
    an air-discharging part having an air outlet arranged for fluid connection to the blower module to drive airflow through the air outlet,
    wherein the blower module is arranged for connection to the air outlet via a duct on the connector unit and the blower module is arranged for connection to the mains electricity supply via a second electrical connector on the blower module which releasably connects to the first electrical connector on the connector unit.

2. The combined washing/drying station of claim 1, wherein the first electrical connector on the connector unit is a shrouded electrical connector for reducing accidental physical contact with a live terminal on the connector.

3. The combined washing/drying station of claim 1, wherein the connector unit comprises one or more electrical components, the electrical components being located inside a sealed compartment inside the connector unit.

4. The combined washing/drying station of claim 3, wherein the sealed compartment is formed in part by a removable front cover, which cover can be removed for access to the inside of the compartment.

5. The combined washing/drying station of claim 4, wherein an access panel is provided in the front cover, which panel allows access to the flow control valve without removing the front cover.

6. The combined washing/drying station of claim 5, wherein the flow-valve is a solenoid valve, the solenoid valve being connected to a low-voltage controller inside the sealed compartment.

7. The combined washing/drying station of claim 1, in which the water-dispensing part and air-discharging part are incorporated as part of a single fixture which can be mounted next to the basin of a sink.

8. The combined washing/drying station of claim 1, further comprising a filter module incorporating an air filter for filtering air drawn in through an air intake on the blower module, the filter module being releasably connectable to the air intake on the blower module for modular replacement of the filter module.

9. The combined washing/drying station of claim 7, wherein the blower module is arranged for connection to the air outlet via an air hose which connects the duct on the connector unit to a duct on the fixture.

* * * * *